United States Patent [19]

Sakata

[11] Patent Number: 4,496,807
[45] Date of Patent: Jan. 29, 1985

[54] TOUCH SIGNAL PROBE

[75] Inventor: Hideo Sakata, Kawasaki, Japan

[73] Assignee: Mitutoyo Mfg. Co., Ltd., Tokyo, Japan

[21] Appl. No.: 530,458

[22] Filed: Feb. 15, 1984

[30] Foreign Application Priority Data

Feb. 21, 1983 [JP] Japan .............................. 58-24045[U]

[51] Int. Cl.³ .............................................. H01H 3/16
[52] U.S. Cl. ................................. 200/61.42; 200/286
[58] Field of Search ................. 200/61.41, 61.42, 6 A, 200/11 J, 286

[56] References Cited

U.S. PATENT DOCUMENTS 4,301,338  11/1981  McMurtry ....................... 200/61.41

Primary Examiner—A. D. Pellinen
Assistant Examiner—Morris Ginsburg
Attorney, Agent, or Firm—Koda and Androlia

[57] ABSTRACT

A touch signal probe comprises a probe casing fixed to a shank body through a shank anchor, the probe casing containing a stylus shaft held for inclining relative to the probe casing, a fixed contact on the inner bottom of the probe casing, a contact receiving portion carrying a movable contact which is fixed to the stylus shaft and defines a set of contacts together with the fixed contact, and a spring operably located between the shank anchor and the contact receiving portion to urge the movable contact toward the fixed contact, whereby the displacement of the stylus shaft can be detected on the separation of the contacts. The touch signal probe is characterised in that the shank anchor slidably receives a spring seat having an engagement face engaged by the spring at one end and in that an adjusting screw for forwardly and rearwardly moving the spring seat is threadedly screwed into the shank anchor, the tip of the adjusting screw engaging the opposite face of the spring seat, whereby the spring can be constricted or expanded to adjust a pressure of contact between the fixed and movable contacts by moving the adjusting screw in either of the opposite directions.

4 Claims, 5 Drawing Figures

TOUCH SIGNAL PROBE

BACKGROUND OF THE INVENTION

1. Field of the Invention

The present invention relates to a touch signal probe and particularly to an improved touch signal probe suitable for use in electrically detecting a contact with an object to be measured.

2. Description of the Prior Art

There is well known a three-dimensional measuring machine for measuring the size and shape of an object placed on a measurement base or a system for measuring the position of an object relative to the tool post of a machine tool. In these measuring systems, a touch signal probe is normally mounted on a table movable relative to the object in any direction. Such a touch signal probe is adapted to produce an electric signal at the output thereof when it contacts the object, the output signal being used to accurately operate the measuring system.

In other words, when the object is contacted by the contactor of the touch signal probe, this contactor is inclined so that the contacts will be separated resulting in the electrical detection of the contact with the object.

In such a kind of system, normally, the contacts used to detect the inclination of said contactor comprises a movable contact and a fixed contact which are brought into engagement with each other when the contactor is in its non-contact with the object. On the other hand, if the contactor contacts the object, the contactor is inclined to open the contacts. This is electrically detected to know the contact of the object with the contactor.

The movable contact is normally urged toward the fixed contact under the action of a spring such that the contacts will not accidentally be separated from each other for any reason such as vibration or others.

If the urging force of the spring is not properly set, however, the contact of the contactor with the object may not properly be detected. If the urging force of the spring is too strong, the sensitivity of detection will vary in different directions in which the contactor contacts the object. On the contrary, if the urging force of the spring is too small, the contactor will tend to swing. This raises such a problem that the contactor cannot return to its accurate home position at all times if the contactor is of the inclination type. As a result, the accuracy of measurement will be degraded.

SUMMARY OF THE INVENTION

In view of the above problems, it is therefore an object of the present invention to provide an improved touch signal probe which can positively prevent the accuracy of measurement from degrading due to an improper force for urging the contacts toward each other.

In order to accomplish the above object, the present invention provides a touch signal probe comprising a probe casing fixed to a shank body through a shank anchor, said probe casing containing a contactor shaft held for inclining relative to said probe casing, a fixed contact on the inner bottom of said probe casing, a contact receiving portion carrying a movable contact which is fixed to said contactor shaft and defines a set of contacts together with said fixed contact, and a spring operably located between said shank anchor and said contact receiving portion to urge said movable contact toward said fixed contact, whereby the displacement of said contactor shaft can be detected on the separation of said contacts, characterised in that said shank anchor slidably receives a spring seat having an engagement face engaged by said spring at one end and in that an adjusting screw for forwardly and rearwardly moving said spring seat is threadedly screwed into said shank anchor, the tip of said adjusting screw engaging the opposite face of said spring seat, whereby said spring can be constricted or expanded to adjust a pressure of contact between said fixed and movable contacts by moving said adjusting screw in either of the opposite directions.

DETAILED DESCRIPTION OF PREFERRED EMBODIMENTS

Figure 1:
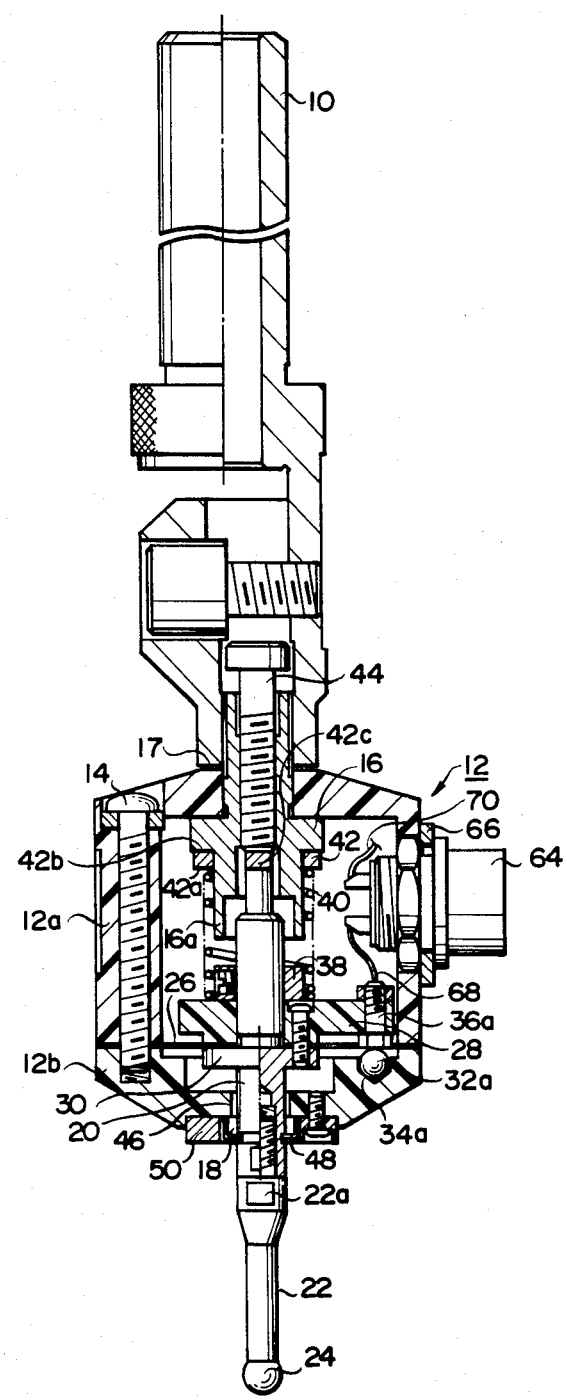
FIG. 1 is a sectional view of a touch signal probe constructed in accordance with the present invention.

FIG. 1 shows a preferred embodiment of a touch signal probe according to the present invention.

Referring to FIG. 1, there is herein shown a shank body 10 which may detachably be mounted on a movable table in a measuring machine or machine tool (not shown). A probe casing 12 is fixedly mounted on the shank body 10, the probe casing being made of an insulation material such as plastics or others. The probe casing 12 includes an upper probe casing portion 12a and a lower probe casing portion 12b detachably mounted on the upper probe casing portion 12a by means of three anchoring screws 14 (only one shown). The upper probe casing portion 12a is threadedly secured to the lower male-threaded end of the shank body 10 by a nut-like shank anchor 16 through a washer 17.

The end of the probe casing 12 opposite to the shank body 10 is provided with an opening 18 through which the stylus shaft 20 extends so as to move laterally within a lateral limited range. The stylus shaft 20 includes a stylus 22 detachably mounted on the outer end thereof. The tip of the stylus 22 supports a spherical end 24 adapted to contact an object to be measured. The stylus shaft 20 is swingably supported by an annular leaf spring 26 the inner edge of which is fixed to the stylus shaft 20 with the outer edge thereof being fixed to the probe casing 12. More particularly, the inner edge of the leaf spring 26 is fixedly located between a contact receiver 28 and a spacer 30 around the stylus shaft 20 while the outer end of the leaf spring 26 is fixedly located between the upper and lower probe casing portions 12a and 12b. Thus, the stylus shaft 20 is limited in radial motion by the leaf spring 26. At the same time, the stylus shaft 20 can incline and move vertically against the action of the leaf spring 26.

Figure 5:
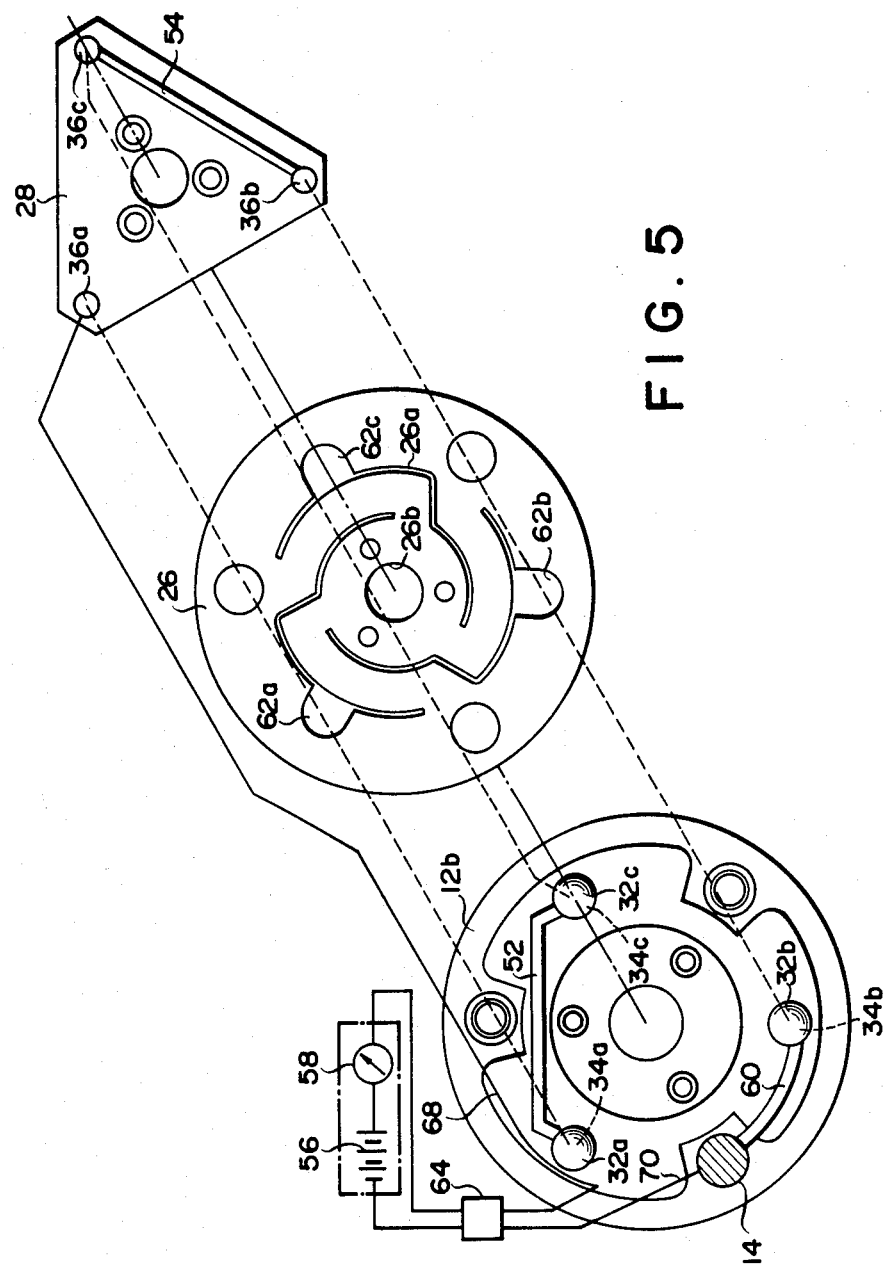
FIG. 5 illustrates a positional relationship among a contact receiving portion, a leaf spring and a lower probe casing.

The inner bottom of the lower probe casing portion 12b is provided with three recesses 34a, 34b and 34c substantially equally spaced away from one another, as shown in FIG. 5. Each of the recesses 34a, 34b and 34c fixedly receives a steel ball 32a, 32b or 32c which serves as a fixed contact. The contact receiver 28, which is fixed to the stylus shaft 20 and made of an insulation material, carries three contact screws 36a, 36b and 36c which engage the steel balls 32a, 32b and 32c and serve as movable contacts. Each of the steel balls 32a, 32b and 32c defines a set of contacts together with the corresponding one of the contact screws 36a, 36b and 36c.

A spring seat 38 is mounted on the stylus shaft 20 around the inner end thereof. Between the spring seat 38 and a stopper ring 16a formed in the shank anchor 16 there is operably located a coil spring 40 which urges the contact screws 36a, 36b and 36c against the respective steel balls 32a, 32b and 32c.

In one aspect of the present invention, there is provided a particular means for adjusting the urging force of the above coil spring depending on various applications of the touch signal probe.

In the illustrated embodiment, a spring seat 42 is located between the coil spring 40 and the shank anchor 16 such that the spring seat 42 can slidably and non-rotatably be mounted relative to the stopper ring 16a of the shank anchor 16. This spring seat 42 includes an engagement face 42a engaging the spring 40 at the end face thereof.

Figure 2:
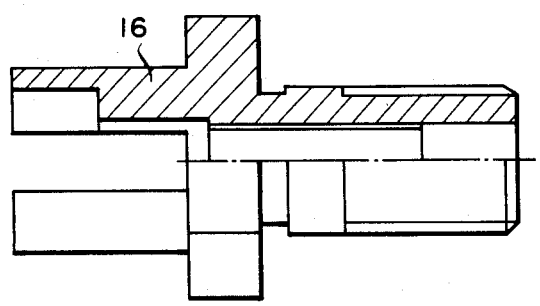
FIG. 2 is a partially sectional view of a shank anchor shown in FIG. 1.
Figure 3:
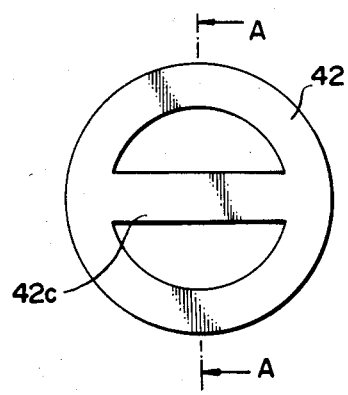
FIG. 3 is a plan view of a spring seat shown in FIG. 1.
Figure 4:
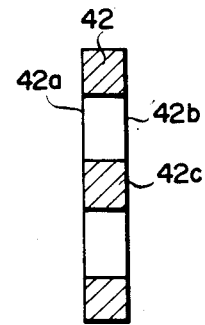
FIG. 4 is a sectional view taken along a line A—A in FIG. 3.

The shank anchor 16 includes a central threaded bore formed therethrough into which an adjusting screw 44 is screwed. The inner end face of this adjusting screw 44 engages the opposite face 42b of the spring seat 42. In the illustrated embodiment, more particularly, the shank anchor 16 includes inner bifurcated end as shown in FIG. 2. On the other hand, the spring seat 42 is in the form of a ring having a central bridge portion 42c which extends in the radial direction, as shown in FIG. 3. The central bridge portion 42c of the spring seat 42 is received by the bifurcated end of the shank anchor 16 such that the adjusting screw 44 will be in engagement with the spring seat 42.

In the illustrated embodiment, therefore, the spring seat 42 is moved by rotating and moving the adjusting screw 44 inwardly or outwardly so that the coil spring 40 will be constricted or expanded in response to the motion of the adjusting screw 44. As a result, the engagement of the movable contact set 36 with the fixed contact set 32 can be adjusted. In such a case, if the adjusting screw 44 has its reduced pitch, the pressure of the spring 40 can easily be adjusted more finely.

As seen best from FIG. 1, the adjusting screw 44 is coaxially located relative to the stylus shaft 20 such that the coil spring 40 will be placed in uniform compression. As a result, the contact pressure between the contact sets 32 and 36 can be equalized to improve the accuracy of measurement.

In the illustrated embodiment, the adjusting screw 44 can externally be operated so that the touch signal probe will extremely easily be adjusted with respect to its contact pressure during operation.

It is understood from the foregoing that according to the present invention, a proper contact pressure between the contact screw set 36 and the steel ball set 32 can be obtained by means of the coil spring 40. The coil spring 40 can be replaced by another proper spring such that an optimum contact pressure will be set depending on various conditions of measurement. Also, any damaged coil spring can easily be replaced by a new coil spring. In the illustrated embodiment, particularly, the spring 40 can more easily be replaced by a new spring since it only engages the stopper ring 16a and spring seat 38 at the opposite ends thereof. As described hereinbefore, furthermore, the probe casing 12 can easily be disassembled to have access to the coil spring 40 since the probe casing 12 is divided into the upper and lower probe casing portions 12a and 12b.

The inner wall of the stopper ring portion 16a in the shank anchor 16 is circumferentially spaced away from the outer periphery of the stylus shaft 20 by a predetermined distance. Also, a predetermined gap is formed between the lower probe casing portion 12b and the stylus shaft 20. Thus, the stylus shaft 20 is limited against its inclination over a predetermined angle by the fact that the stylus shaft 20 may engage the inner wall of the stopper ring 16a and the abutment 46 of the lower probe casing portion 12b.

The opening 18 of the lower probe casing portion 12b is closed by a dust-proof covering 48 the inner edge of which engages the outer periphery of the stylus shaft 20. The outer edge of the dust-proof covering 48 is fixed to the lower probe casing portion 12b by means of a holding plate 50. In such a manner, any foreign matter can be prevented from entering the interior of the probe casing 12 through the opening 18. However, this does not prevent the inclining motion of the stylus shaft 20 relative to the probe casing 12.

A relationship among the contact receiving portion 28, leaf spring 26 and lower probe casing portion 12b will now be described below with reference to FIG. 5.

The steel balls 32a, 32b and 32c fixedly located on the inner bottom of the lower probe casing portion 12b are in engagement with the contact screws 36a, 36b and 36c of the contact receiving portion 28. The steel balls 32a and 32c are electrically connected with a copper plate 52 embedded in the lower probe casing portion 12b while the contact screws 36b and 36c are electrically connected with a copper plate 54 embedded in the contact receiving portion 28. There are also a power supply 56 and contact detector 58 which are connected in series with each other to form a detector circuit. The detector circuit is electrically connected at one end with the contact screw 36a with the other end thereof being electrically connected with the anchoring screw 14 which is used as a portion of the lead for the detector circuit. This saves the material of the lead and also solves a problem with respect to the lead which is contained in the probe casing 12 having a limited space.

In this manner, a loop is formed through the contact detector 58, contact screw 36a, steel ball 32a, copper plate 52, steel ball 32c, contact screw 36c, copper plate 54, contact screw 36b, steel ball 32b, copper plate 60, anchoring screw 14, power supply 56 and contact detector 58 in the order described. Thus, the contact of the stylus 22 fixed to the tip of the stylus shaft 20 with an object to be measured can be detected. More particularly, all the contact sets (steel ball 32a and contact screw 36a), (32b and 36b), (32c and 36c) engage each other in such a state that the stylus 22 does not contact the object. Therefore, the contact detector 58 is in its energization. If the stylus 22 contacts the object, the stylus shaft 20 will be inclined or vertically moved. As a result, at least one of the contact sets (32a, 36a), (32b, 36b) and (32c, 36c) is separated to dis-energize the contact detector 58 so that the contact of the stylus 22 with the object will accurately be detected.

Referring again to FIG. 5, the leaf spring 26 includes channels 26a each having a predetermined configuration. The inner edge 26b of the leaf spring 26 is fixed to the stylus shaft 20 with the outer edge thereof being fixed to the probe casing 12, as described hereinbefore.

Accordingly, the stylus shaft 20 is properly limited in radial motion by the leaf spring 26 under such a state that the stylus 22 does not contact the object. At the same time, the stylus 22 is permitted to incline and vertically move. Furthermore, the leaf spring 26 includes apertures 62a, 62b and 62c formed therein at positions corresponding to the respective steel balls 32a, 32b and 32c. These apertures 62a, 62b and 62c keep the insulation among the steel balls 32a, 32b and 32c, the contact screws 36a, 36b and 36c and the leaf spring 26.

As seen from FIGS. 1 and 5, a plug 64 is mounted on the side wall of the upper probe casing portion 12a through a plug mounting plate 66. This plug 64 has two leads 68 and 70 which are directly connected with the contact screw 36a and anchoring screw 14, respectively. Therefore, the leads can be reduced in length so that the probe casing itself can be reduced in size.

In accordance with the present invention, the contact pressure between the movable and fixed contacts can properly and easily be adjusted such that, where the touch signal probe is to be changed in position or where the contactor is to be replaced by other contactor having a different shape, the contact pressure between the movable and fixed contacts can properly be adjusted. Therefore, the contact of the contactor with the object can be detected with extremely high accuracy of measurement.

I claim:

1. A touch signal probe comprising a probe casing fixed to a shank body through a shank anchor, said probe casing containing a stylus shaft held for inclining relative to said probe casing, fixed contact means on the inner bottom of said probe casing, contact receiving means carrying movable contact means which is fixed to said stylus shaft and defines a set of contacts together with said fixed contact means, and spring means operably located between said shank anchor and said contact receiving means to urge said movable contact means toward said fixed contact means, whereby the displacement of said stylus shaft can be detected on the separation of said contact means, characterised in that said shank anchor slidably receives a spring seat having an engagement face engaged by said spring means at one end and in that an adjusting screw for forwardly and rearwardly moving said spring seat is threadedly screwed into said shank anchor, the tip of said adjusting screw engaging the opposite face from the engagement face of said spring seat, whereby said spring means can be constricted or expanded to adjust a pressure of contact between said fixed and movable contact means by moving said adjusting screw in either of the opposite directions.

2. A touch signal probe as defined in claim 1 wherein said shank anchor includes a bifurcated end and wherein said spring seat is in the form of an annular frame having a central bridge portion, said central bridge portion being received in the bifurcated end of said shank anchor and engaged by the tip of said adjusting screw such that said spring seat will slidably and non-rotatably be mounted on the bifurcated end of said shank anchor.

3. A touch signal probe as defined in claim 1 wherein said adjusting screw is threadedly screwed into the shank anchor in the coaxial relationship with said stylus shaft to provide a uniform compression to said spring means.

4. A touch signal probe as defined in claim 1 wherein said adjusting screw is mounted in said shank anchor such that said adjusting screw can externally be operated.

* * * * *